United States Patent [19]
Farinato et al.

[11] Patent Number: 6,117,938
[45] Date of Patent: Sep. 12, 2000

[54] POLYMER BLENDS FOR DEWATERING

[75] Inventors: Raymond Salvatore Farinato, Cos Cob; Naijie Zhang, Ridgefield, both of Conn.; David Alexander Mortimer, Bradford, United Kingdom

[73] Assignee: Cytec Technology Corp., Wilmington, Del.

[21] Appl. No.: 09/020,201

[22] Filed: Feb. 6, 1998

[51] Int. Cl.[7] .................................................. C08F 2/32
[52] U.S. Cl. ..................... 524/801; 524/501; 524/922
[58] Field of Search ................................. 524/801, 521, 524/501, 922

[56] References Cited

U.S. PATENT DOCUMENTS

| | | | |
|---|---|---|---|
| 3,235,490 | 2/1966 | Goren | 210/52 |
| 3,284,393 | 11/1966 | Vanderhoff et al. | 260/29.6 |
| 3,968,037 | 7/1976 | Morgan et al. | 210/47 |
| 4,059,552 | 11/1977 | Zweigle et al. | 260/29.6 TA |
| 4,172,066 | 10/1979 | Zweigle et al. | 260/29.6 TA |
| 4,421,902 | 12/1983 | Chang et al. | 526/317 |
| 4,581,402 | 4/1986 | Dunk et al. | 524/317 |
| 4,588,508 | 5/1986 | Allenson et al. | 210/708 |
| 4,720,346 | 1/1988 | Flesher et al. | 210/734 |
| 4,783,513 | 11/1988 | Cadel et al. | 526/216 |
| 4,943,378 | 7/1990 | Flesher et al. | 210/734 |
| 4,950,725 | 8/1990 | Flesher et al. | 526/307.6 |
| 4,956,399 | 9/1990 | Kozakiewicz et al. | 523/223 |
| 4,956,400 | 9/1990 | Kozakiewicz et al. | 523/223 |
| 5,037,881 | 8/1991 | Kozakiewicz et al. | 524/812 |
| 5,070,133 | 12/1991 | Miyajima | 524/501 |
| 5,100,951 | 3/1992 | Fillipo et al. | 524/501 |
| 5,152,903 | 10/1992 | Neff et al. | 210/734 |
| 5,169,540 | 12/1992 | Fillipo et al. | 210/728 |
| 5,340,865 | 8/1994 | Neff et al. | 524/317 |
| 5,405,554 | 4/1995 | Neff et al. | 252/309 |
| 5,627,260 | 5/1997 | Huang et al. | 528/486 |
| 5,643,461 | 7/1997 | Neff et al. | 210/728 |
| 5,807,489 | 9/1998 | Farinato et al. | 210/734 |
| 5,879,564 | 3/1999 | Farinato | 210/734 |

FOREIGN PATENT DOCUMENTS

| | | |
|---|---|---|
| 0 643 017 A1 | 10/1993 | European Pat. Off. . |
| 0 610 955 A2 | 11/1994 | European Pat. Off. . |
| 2589145 | 10/1985 | France . |
| 1-203251 | 2/1988 | Japan . |
| 64-85199 | 3/1989 | Japan . |
| 60/2453/01 | of 0000 | United Kingdom . |
| WO 95/14728 | 6/1995 | WIPO ................................ C08J 3/03 |
| WO 97/18167 | 5/1997 | WIPO ................................ C02F 1/56 |

OTHER PUBLICATIONS

How Cationic Polymer Structure Relates to Dewatering Efficiency of Waste–Activated Sludges J.E. Morgan et al., Adv. Chem. Ser., vol. 187, pp. 235–252 (1980).

Modern Plastics Encyclopedia/88,McGraw Hill, Oct. 1987, pp. 147–148.

Operation of Municipal Wastewater Treatment Plants, Manual of Practice MOP 11, vol. 11, 1990, pp. 418–419 and 501–516.

U.S. Ser. No. 08/028,916.
U.S. Ser. No. 08/028,001.
U.S. Ser. No. 08/437,258.
U.S. Ser. No. 08/454,974.
U.S. Ser. No. 08/455,419.

J.E. Morgan, M.A. Yorke, and J.e. Booth, How Cationic Polymer Structure Relates to Dewatering Efficiency of Waste–Activated Sludges, American Chemical Society 1980 : Adv. Chem. Ser. *187* (Ions Polym.) pp. 235–252.

*Primary Examiner*—James J. Seidleck
*Assistant Examiner*—U. K. Rajguru
*Attorney, Agent, or Firm*—Claire M. Schultz; Joseph J. Mallon; Liza Negron

[57] ABSTRACT

The invention provides blends of high molecular weight, water-soluble cationic structured polymers with high molecular weight, water-soluble, cationic polymers which either are linear or which have a lower degree of structure. The blends are useful for dewatering dispersions of suspended solids, achieving good dewatering rates at relatively low dosage levels.

17 Claims, 5 Drawing Sheets

POLYMER BLENDS FOR DEWATERING

BACKGROUND OF THE INVENTION

Flocculation is a method of dewatering suspended solids by agglomerating the solids. Flocculation materially improves the dewatering rate of many types of suspended solids, including those used in mineral, papermaking, waste water treating and oil field applications.

Synthetic polymer flocculants have been utilized in the industry since the 1950's as flocculating agents in the treatment of suspended solids. However, due to modern concerns with environmental protection, sludge incineration, transportation and disposal costs, it is increasingly desirable to provide polymeric flocculants which can achieve a satisfactory level of dewatering at relatively low dosage levels, as compared with conventional polymeric flocculants.

The present invention provides compositions and methods for dewatering suspended solids, including those frequently encountered in the waste water treating, mining and papermaking industries, using high molecular weight, water-soluble, cationic polymer flocculants, as well as methods for making said compositions.

Linear polymer flocculants have been "structured" in the art through the use of branching or crosslinking agents. Polymer structuring is discussed by J. E. Morgan et al., Adv. Chem. Ser., Vol. 187, pp. 235–52 (1980). U.S. Pat. Nos. 4,720,346 and 4,943,378 describe the use of crosslinked cationic polymer particles having a dry particle size below 10 micrometers ($\mu$m).

U.S. Pat. Nos. 5,152,903 and 5,340,865 disclose a method of flocculating using cross-linked cationic polymer microparticles. U.S. Pat. No. 3,235,490 describes a flocculation method which utilizes crosslinked polyacrylamide. U.S. Pat. No. 3,968,037 teaches a method of releasing water from activated sewage sludge using crosslinked cationic emulsion polymers. Methods and compositions useful for thickening aqueous media are given in U.S. Pat. Nos. 4,059,552 and 4,172,066. Pending U.S. application Ser. Nos. 08/028916, 08/028,001, 07/437258, 08/454974 and 08/455419, which are assigned to assignee to this invention and are all hereby incorporated herein by reference, describe methods for flocculating suspended solids using cationic, high molecular weight, water-soluble, branched polymers.

The "sedimentation value" varies as a function of the degree of structuring present in the polymer, and therefore can be utilized as a measure of the degree of structuring in a polymer. The "sedimentation value" is a sensitive indicum of the settling rate in a centrifugal field of a water-soluble or water-swellable polymer in salt solution. A sedimentation value of less than 10% means that there is little or no tendency for the polymer in salt solution to sediment when subjected to a centrifugal field. A sedimentation value is determined by preparing a solution of a particular polymer in NaCl of a defined strength, centrifuging part of the solution for a given length of time and then measuring the polymer concentration, for example from the ultraviolet (UV) absorbance of the uncentrifuged part and of the supernatant of the centrifuged part. A wavelength of 215 nm has been found to be useful for these purposes with acrylamide-containing polymers. The sedimentation value $\Delta$UV represents the absorbance of the centrifuged part compared to the absorbance of the uncentrifuged part and is calculated as $\Delta UV = [\Delta A(\text{uncentrifuged}) - \Delta A(\text{centrifuged})]/\Delta A$ (uncentrifuged), wherein $\Delta A = A(\text{polymer solution}) - A$ (salt solution) and A is the measured UV absorbance. The value calculated thereby is multiplied by 100 to give the sedimentation value, which is expressed as a percentage.

It is known in the art to blend polymers of different characteristics in order to provide flocculants of improved characteristics. For instance, a number of workers have proposed blending inverse emulsions of high molecular weight (typically in excess of 1 million) cationic polymers with inverse emulsions of low molecular weight (below 1 million) cationic polymers, to provide flocculants of improved stability (e.g. U.S. Pat. Nos. 5,100,951 and 5,169,540) or improved dewatering properties (e.g. U.S. Pat. Nos. 5,405,554 and 5,643,461).

U.S. Pat. No. 4,943,378 discloses polymeric flocculants which have a specific viscosity above 10 (as measured by a capillary viscometer at 34° C. on a 0.5% solution in deionised water) and which comprise crosslinked water-insoluble, water-swellable polymeric particles that have a dry size of below 10 $\mu$m. In one embodiment these particulate flocculants may be made by blending a dissolved polymer with a particulate, generally insoluble polymer, which polymer may be made from the same monomers and differing only in the degree of crosslinking.

U.S. Pat. No. 4,950,725 proposes that the properties of crosslinked, particulate, water-insoluble but water-swellable polymers formed from water-soluble ethylenically unsaturated monomers and monomer blends should be optimised for the intended use of the polymer particles by conducting the polymerisation reaction under uniform reaction conditions, in particular by control of the way in which the crosslinking agent is added and/or the selection of the crosslinking agent(s). By this means, the degree of structure in the final polymer particles can be influenced in a desired direction.

Another approach to providing polymeric flocculants with improved properties is to form multimodal polymeric emulsion systems having two or more different aqueous droplet size distributions or modes, by blending two polymeric emulsions with the required individual characteristics. See, for example, WO95/14728 and the background art discussed therein.

Finally, reference is made to WO97/18167 which discloses the use as flocculants of cationic water-soluble or water-swellable polymers having a bulk viscosity to standard viscosity ratio (BV/SV) of about 300–500 and a sedimentation value about 10% or less. The BV/SV ratio, like the sedimentation value, is a function of the degree of structuring present in the cationic polymers.

In some applications, an acceptable flocculation performance cannot be achieved with linear polymeric flocculants and the use of structured polymers is necessary in order to meet performance specifications. However, structured polymers often need to be employed at higher dosages than linear polymers, and therefore not only involve greater costs but also these higher rates of usage cause increased environmental concerns.

SUMMARY OF THE INVENTION

It has now unexpectedly been found that by forming blends of structured, high molecular weight ionic polymers with linear, or at least less structured, high molecular weight ionic polymers it is possible in certain cases to achieve a level of dewatering performance similar to that of highly structured polymers but at a reduced level of dose.

Another advantage of forming blends of more structured polymers with linear or less structured polymers is that it permits the user to tailor the dewatering performance of the flocculants to that which is most suitable for the circumstances in question.

It is, of course, possible that prior art blends may have, in fact, constituted a blend of linear polymer and structured polymer since in practice structured polymers may contain a linear fraction while conversely linear polymers may have some inherent chain nonlinearity. However, as far as we are aware the art has not previously proposed deliberately blending structured polymers with linear or less structured polymers in the controlled manner proposed herein, nor is it to be expected that prior art blends would have inherently met the sedimentation value requirements of the present invention.

Other features and advantages of the invention will become apparent from the detailed description below.

In accordance with this invention in one aspect there is provided a water-in-oil polymer emulsion in which the aqueous phase comprises a blend of:

(i) a water-soluble, cationic, structured first polymer having a molecular weight of at least $1 \times 10^6$, and (ii) a water-soluble, cationic second polymer having a molecular weight of at least $1 \times 10^6$, said second polymer being linear or having a lower degree of structure than said first polymer, and said polymer blend having a sedimentation value of less than 10% when measured in 0.001M NaCl and a sedimentation value of 10% or above when measured in 1M NaCl.

In another aspect the present invention provides a polymer blend in aqueous solution comprising:

(i) a water-soluble, cationic, structured first polymer having a molecular weight of at least $1 \times 10^6$, and (ii) a water-soluble, cationic, second polymer having a molecular weight of at least $1 \times 10^6$, said second polymer being linear or having a lower degree of structure than said first polymer, and said polymer blend having a sedimentation value of less than 10% when measured in 0.001M NaCl and a sedimentation value of 10% or above when measured in 1M NaCl.

Still further, the present invention provides a polymer blend comprising:

(i) a water-soluble, cationic, structured first polymer having a molecular weight of at least $1 \times 10^6$, and (ii) a water-soluble, cationic second polymer having a molecular weight of at least $1 \times 10^6$, said second polymer being linear or having a lower degree of structure than said first polymer, and said polymer blend having a sedimentation value of less than 10% when measured in 0.001M NaCl and a sedimentation value of 10% or above when measured in 1M NaCl.

Yet further, the present invention provides a method of dewatering a dispersion of suspended solids, comprising the steps of:

(a) adding to the dispersion an effective amount of a flocculant which is a polymer emulsion or polymer blend of this invention, and (b) effecting dewatering.

In a specific aspect, the present invention provides a method for dewatering a waste activated sludge by flocculation using a polymeric flocculant, comprising the steps of simultaneously or sequentially adding to the sludge:

(i) a water-soluble, cationic structured first polymer having a molecular weight above $1 \times 10^6$, and (ii) a water-soluble, cationic second polymer having a molecular weight of at least $1 \times 10^6$, said second polymer being linear or having a lower degree of structure than said first polymer, the amounts of said first and second polymers added being such that there is formed in said sludge a polymer blend, wherein said polymer blend has a sedimentation value of less than 10% when measured in 0.001M NaCl and a sedimentation value of 10% or above when measured in 1M NaCl, and thereafter effecting dewatering of the sludge.

DETAILED DESCRIPTION OF PREFERRED EMBODIMENT

Figure 1:
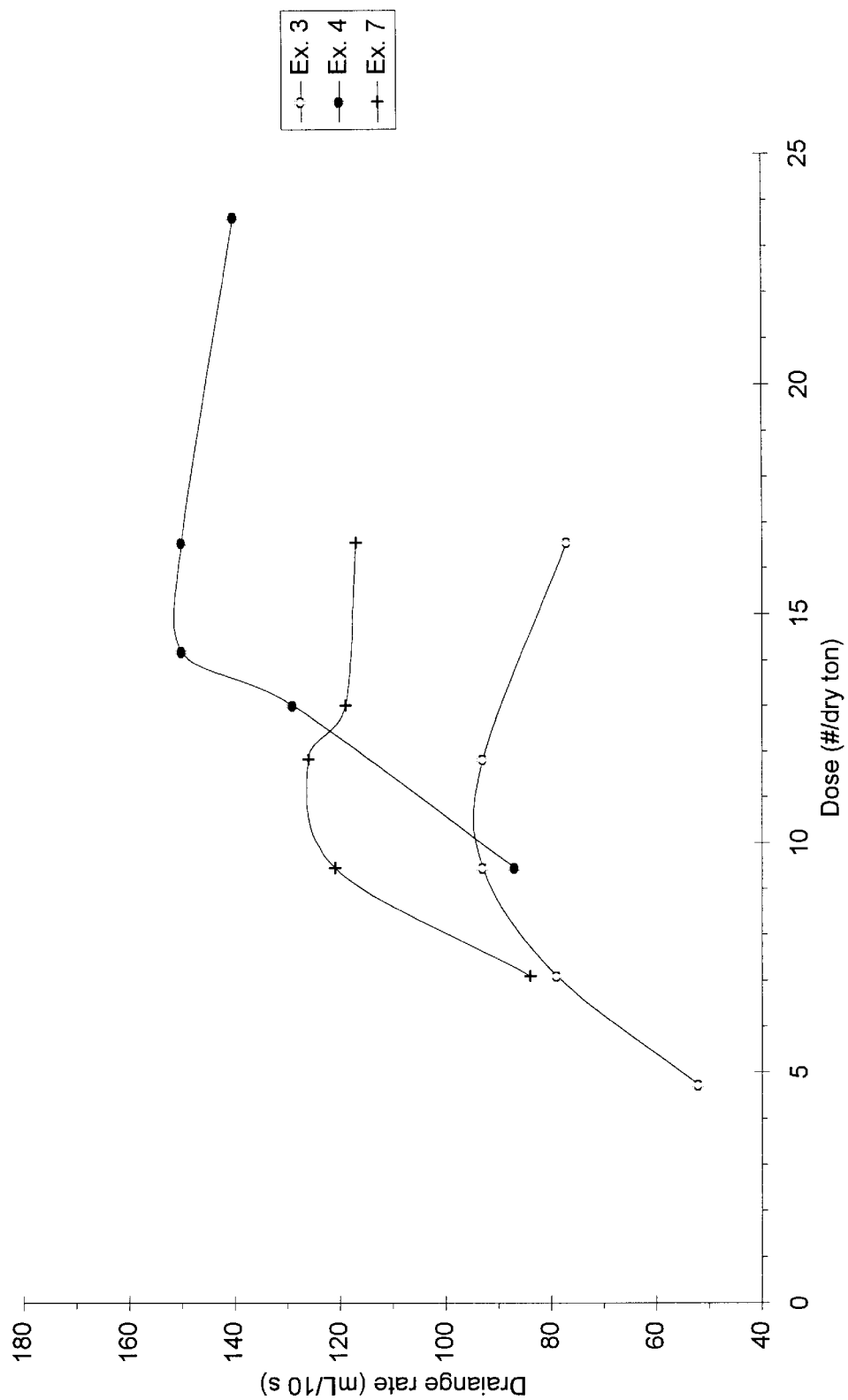
FIGS. 1–5 are graphs showing dose performance curves for polymer blends in accordance with the invention.
Figure 2:
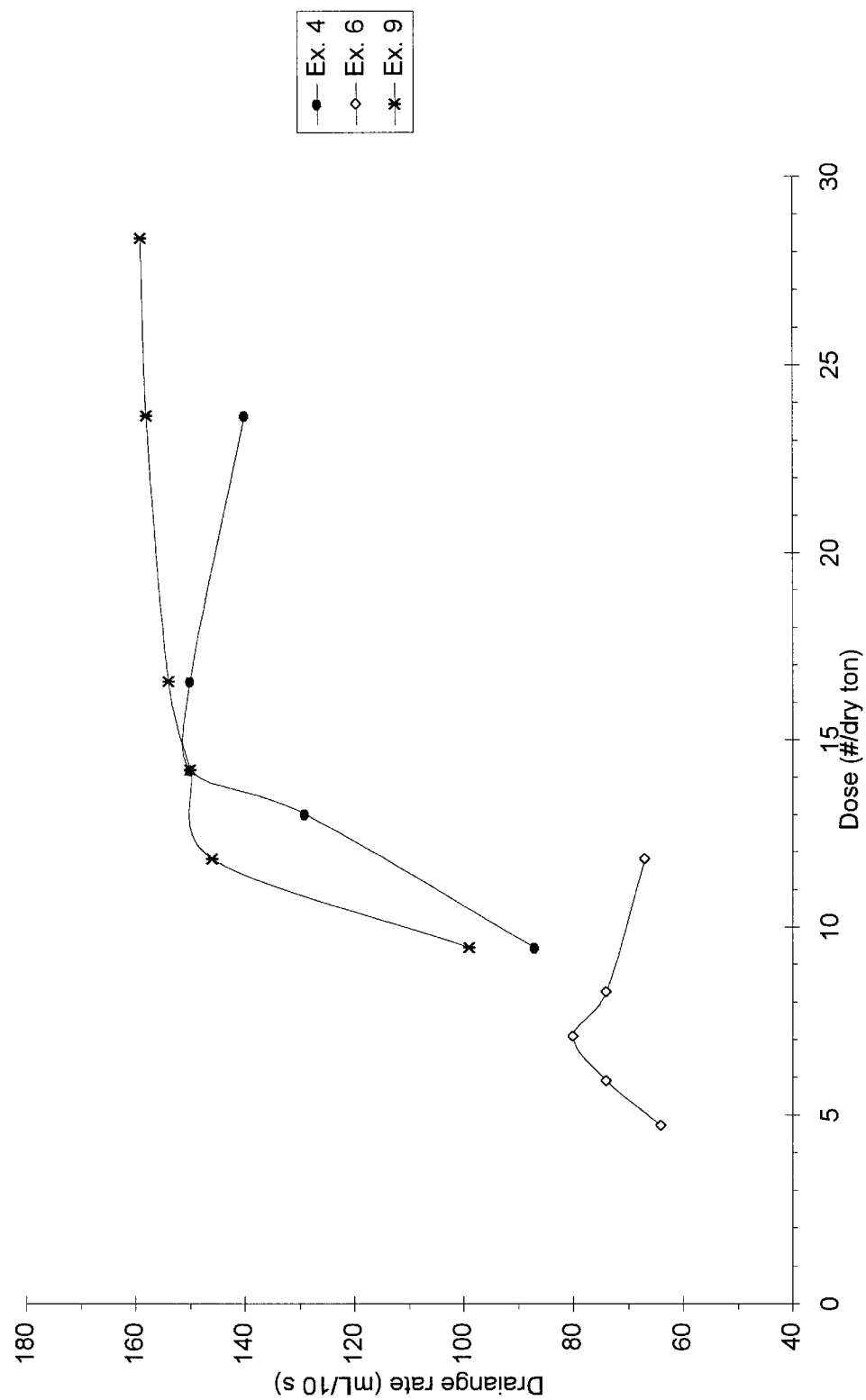
Figure 3:
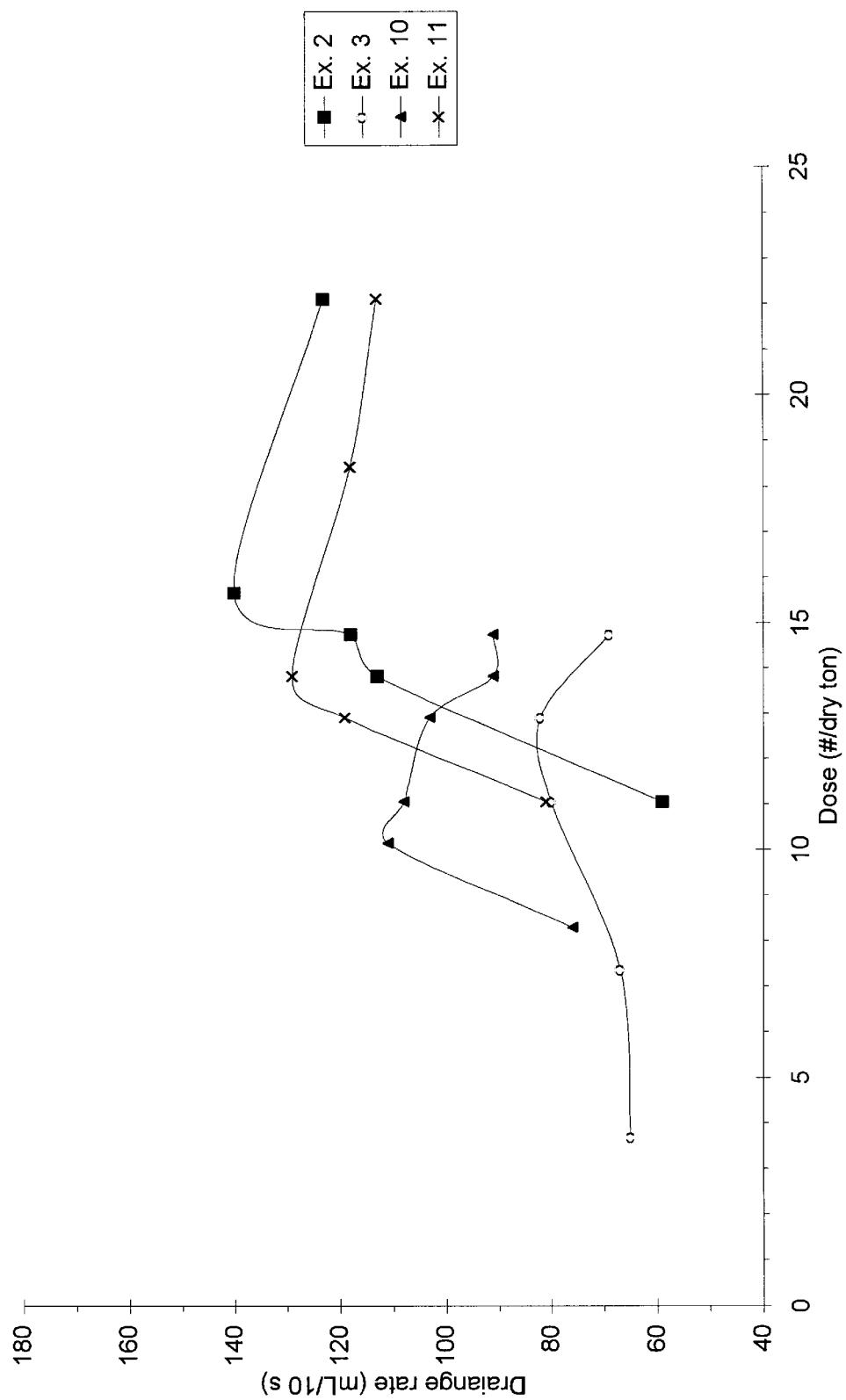
Figure 4:
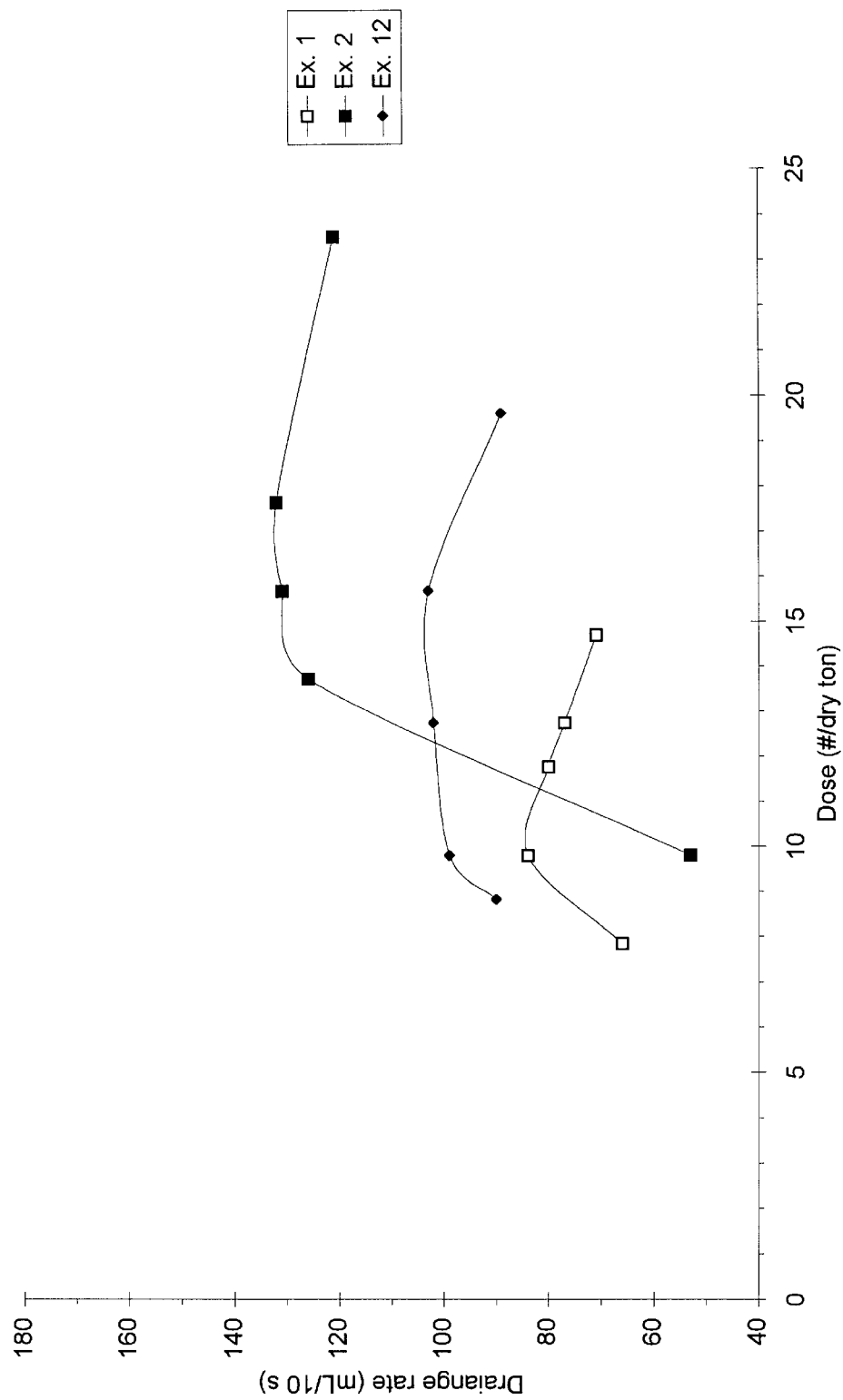
Figure 5:
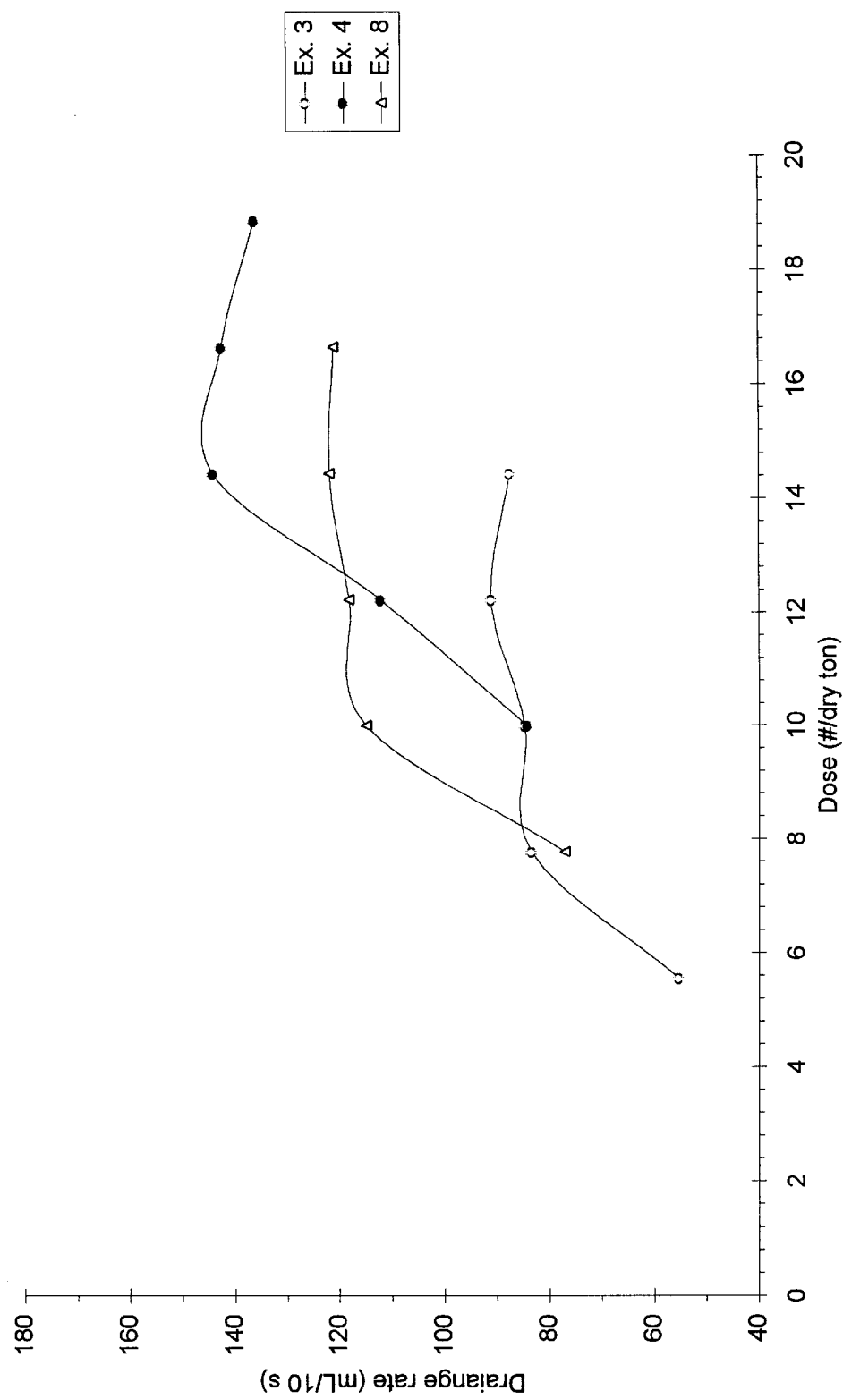

The cationic, water-soluble polymers which are used according to this invention are high molecular weight, i.e. with a molecular weight above $1 \times 10^6$, preferably $3 \times 10^6$ and usually above $5 \times 10^6$.

As is well known, the molecular weights of structured polymers are exceedingly difficult to determine as there is a fraction of macromolecules of ultra-high molecular weight and often non-linear topology. The molecular weight of this fraction may easily exceed $100 \times 10^6$, and is difficult to quantify with current technology. In these circumstances, we determine the molecular weight of the primary chains, i.e. by forming the polymer under similar polymerization conditions but in the absence of the branching or crosslinking agent giving rise to the structure, using conventional methods such as intensity light scattering as described in "Polymer Characterization" Schroder and Arnat, Hansen Publishers, (1989) pp 53–62, or intrinsic viscosity (calibrated with intensity light scattering) if the sample is known to contain only linear molecules and the conversion coefficients (intrinsic viscosity to molecular weight) are known. Hence, in this specification the molecular weight values of structured polymers refer to the molecular weights of the primary chains of the equivalent linear polymers.

High molecular weight, cationic, water-soluble polymers for use herein are formed by the polymerization of cationic ethylenically unsaturated monomers, alone or with comonomers. High molecular weight, cationic, water soluble or water-swellable polymers are also formed by polymerizing or copolymerizing nonionic monomers, e.g. acrylamide, to form nonionic polymers, e.g. polyacrylamide, and functionalizing said nonionic polymers to impart cationic groups to the polymer, preferably tertiary aminomethyl groups which may be quaternized.

Cationic monomers useful in the practice of this invention include diallyldimethylammonium chloride; acryloyloxyethyltrimethylammonium chloride; methacryloyloxyethyltrimethylammonium chloride; dialkylaminoalkyl(alk) acrylate compounds; and quaternaries and salts thereof, such as N,N-dimethylaminoethylmethacrylate methylchloride salt; monomers of N,N-dialkylaminoalkyl(meth) acrylamides; and salts and quaternaries thereof, such as N,N-dialkylaminoethylacrylamides; methacrylamidopropyltrimethylammonium chloride; 1-methylacryloyl-4-methyl piperazine and the like. Quaternized dialkylaminoalkyl(alk) acrylate monomers are preferred, and acryloyloxyethyltrimethylammonium chloride and methacryloyloxyethyltrimethylammonium chloride are most preferred. Cationic monomers are generally of the following formulae:

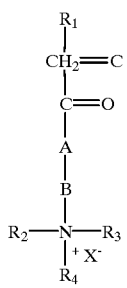

where $R_1$ is hydrogen or methyl; $R_2$ is lower alkyl of $C_1$ to $C_4$; $R_3$ is lower alkyl of $C_1$ to $C_4$; $R_4$ is hydrogen, alkyl of $C_1$ to $C_{12}$, aryl or hydroxyethyl and $R_2$ and $R_3$ or $R_2$ and $R_4$ can combine to form a cyclic ring containing one or more hetero atoms, and X is the conjugate base of an acid, A is oxygen or $-NR_1-$ wherein $R_1$ is as defined above, and B is an alkylene group of $C_1$ to $C_{12}$; or

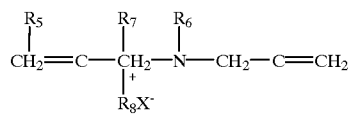

where $R_5$ and $R_8$ are hydrogen or methyl, $R_7$ is hydrogen, alkyl of $C_1$ to $C_{12}$, benzyl or hydroxyethyl; and X is defined above.

Nonionic monomers, suitable in the practice of this invention, generally comprise acrylamides; methacrylamides; and N-alkylacrylamides, such as N-methylacrylamide; and N,N-dialkylacrylamides, such as N,N-dimethylacrylamide. Acrylamide and methacrylamide are preferred. Small amounts, e.g. 10 mole % or less, based on total moles of recurring units in the polymer, of sparingly soluble nonionic monomers such as methyl acrylate, methyl methacrylate, ethyl acrylate, acrylonitrile, etc. and the like may also be suitable.

Cationic homopolymers having recurring units of one or more cationic monomers may be employed in this invention. Preferably, one or more nonionic monomers, e.g. acrylamide, may be copolymerized with one or more cationic monomers, e.g. acryloyloxyethyltrimethylammonium chloride to produce cationic copolymer. Preferably, cationic copolymers are comprised of at least about 20 mole % of recurring units of cationic monomer, based on the total number of moles of recurring units in the polymer. Herein, when referring to the mole % of recurring units in a polymer, all mole % are based on the total number of moles of recurring units in the copolymer. More preferably, the copolymers are comprised of at least 25 mole % of recurring units of cationic monomer; most preferably, the copolymers are comprised of at least 30 mole % of recurring units of cationic monomer.

Cationic charge may also be imparted to a polymer by functionalizing nonionic recurring units of the polymer. For instance, acrylamide units in the polymer backbone may be reacted with an effective amount of a formaldehyde and a secondary amine or a complex thereof in a manner known per se to form Mannich acrylamides having pendant tertiary aminomethyl groups that are cationic at low pH, or the tertiary aminomethyl groups can be quaternized to form cationic pendant groups following procedures known to those skilled in the art, e.g. see U.S. Pat. No. 5,037,881, 4,956,399 and 4,956,400, which are incorporated herein by reference. Formaldehydes useful in the practice of this invention are selected from formaldehyde, paraformaldehyde, trioxane, or aqueous formalin, etc. Useful secondary amines are selected from dimethylamine, methylethylamine, diethylamine, amylmethylamine, dibutylamine, dibenzylamine, piperidine, morpholine, ethanolmethylamine, diethanolamine, or mixtures thereof. Especially preferred is a process wherein the formaldehyde comprises formalin and the secondary amine comprises dimethylamine. It is also contemplated to employ a formaldehyde-secondary amine complex such as N,N-dimethylaminomethanol.

The backbone polymer which contains the nonionic groups may be comprised completely of nonionic groups, or may be comprised partly of nonionic group and partly of ionic groups prior to the functionalization reaction that imparts the cationic groups. Preferably, a polyacrylamide emulsion or microemulsion polymer is polymerized in a known manner to form a precursor polymer, subjected to Mannich reaction conditions, and, optionally, quaternized, as in U.S. Pat. Nos. 5,037,881, 4,956,399; and 4,956,400; which are hereby incorporated herein by reference. Preferably, at least about 20 mole % of the recurring units are cationically charged. More preferably, at least about 30 mole % of the recurring units are cationically charged. Cationic charge may also preferably be up to about 80 mole % recurring cationic units.

Particularly preferred cationic polymers for use in this invention contain recurring (meth)acrylamide units and at least about 30 mole percent quaternized dialkylamino(alk) acrylate units based on the total moles of recurring units in the polymer.

Most desirably, there are used copolymers of acrylamide and acryloyloxyethyltrimethylammonium chloride, especially those containing from 5–65 mol % of acrylamide.

Whilst it is by no means essential it is convenient if the polymers should be of the same chemical composition since this helps to avoid unwanted interactions between the blended polymers which might, for example, cause instability. For this reason also, it is preferred that the polymers should be made in similar formulations, e.g. with similar oils, surfactants, droplet sizes, etc, so as to ensure good compatibility on blending.

It is necessary that the polymers making up the blend should have some cationicity, typically from 20 mol % up to fully charged. The blends can be made of polymers with different cationicities, to obtain an average ionicity which is optimal for the application.

In order to form a structured polymer, the polymerization of the monomers is generally conducted in the presence of branching agent or crosslinking agent to form a branched, or crosslinked, homopolymer or copolymer. The branching agent generally comprises compounds having either at least two double bonds, or at least a double bond and a reactive group, or at least two reactive groups. Polyfunctional branching agents should have at least some water-solubility. Preferred polyfunctional branching agents include compounds containing at least two double bonds, e.g. methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide; and the like. Also preferred are polyfunctional branching agents containing at least one double bond and at least one reactive group including glycidyl acrylate; acrolein; methylolacrylamide; and the like. Polyfunctional branching agents containing at least two reactive groups include aldehydes, such as glyoxal; diepoxy compounds and epichlorohydrin and the like. Methylenebisacrylamide ("MBA") is often a preferred branching agent. Other branching agents that can be used are tetra(ethylene glycol) diacrylate, dimethyl allylaminoethylacrylate ammonium chloride, diallyloxyacetic acid sodium salt, diallyloxyamide, trimethylol propane ethoxylate triacrylate, N-allylacrylamide and the branching agents disclosed in U.S. Pat. No. 4,950,725.

The concentration of the branching agent will depend on the agent concerned and, of course, on the degree of structure which is desired to impart. By way of illustration, the concentration of MBA, a preferred crosslinker, will usually be up to 100 ppm, based on the weight of monomers, preferably up to 50 ppm, but with dimethylallyaminoethylacrylate ammonium chloride the concentration may run up to 1000 ppm, based on monomer weight, although usually is less than 300 ppm.

It is necessary that the polymers used herein have the potential to be fully hydrated and non-sedimenting in pure water, and accordingly the amount of branching agent which is used should not be so great that structure develops to the point that the polymer becomes water-insoluble. The polymers are therefore termed herein "water-soluble" although water-swellable polymers are also included within the scope of the invention provided that they remain fully hydrated and non-sedimenting in pure water.

The extent to which it is preferred to introduce structure into the polymers used herein will be discussed in greater detail hereafter.

If desired, the polymerization may be conducted also in the presence of a chain transfer agent. These help to control the introduction of the required degree of structure into the polymer. Many such chain transfer agents are known to those skilled in the art, including lactic acid and alcohols such as isopropyl alcohol, mercaptans such as 2-mercaptoethanol, thioacids, phosphites such as sodium hyprophosphite and sulfites. Preferred chain transfer agents are isopropyl alcohol and lactic acid.

If used, the amount of chain transfer agent employed will depend in part on the particular chain transfer agent selected, since these have different efficiencies in the chain transfer process. In the case of isopropyl alcohol, the concentration would typically be up to 2% by weight of the total monomer content, whereas with lactic acid amounts up to 1% by weight would be more usual, often less than 0.4% by weight, e.g. from 0.2–0.3% by weight.

Polymerization may be carried out using conventional inverse emulsion polymerization techniques. These techniques are widely known to those skilled in the art. For instance, emulsion polymerization procedures generally involve the preparation of two phases as described in U.S. Pat. No. 3,284,393, which is incorporated herein by reference. The aqueous phase is comprised of the monomer(s), branching agent, if present, and chain-transfer agent, if present, dissolved in deionized water, and other additives well known to those skilled in the art, such as stabilizers and pH adjusters as required. The oil phase usually comprises a water-insoluble hydrocarbon solution of surfactant(s). The aqueous phase and oil phase are mixed and homogenized in a conventional apparatus to form an emulsion, sparged with inert gas or otherwise deoxygenated, then polymerization initiated in the usual manner.

Any conventional additives may be used for stabilization purposes. Suitable additives include ammonium sulfite, ethylene diaminetetraacetic acid (disodium salt) and diethylene triaminepentaacetate (pentasodium salt). See Modern Plastics Encyclopedia/88, McGraw Hill, October 1987, pp. 147–8.

Any conventional initiator may be employed to initiate polymerization, including thermal, redox and ultraviolet radiation. Suitable for use in this invention are azobisisobutyronitrile; sodium sulfite; sodium metabisulfite; 2,2,'-azobis (2-methyl-2-amidinopropane) dihydrochloride; ammonium persulfate, ferrous ammonium sulfate hexahydrate, and organic peroxides, and the like.

As hereinabove stated, the present invention is predicated on the discovery that polymeric flocculants of improved dewatering performance can be obtained by blending a structured, cationic, high molecular weight, water-soluble polymer with a less structured, sometimes preferably linear, cationic high molecular weight, water-soluble polymer.

More particularly, it has been found that improved dewatering performance is obtainable when there is formed a polymer bend whose sedimentation value is less than 10% when measured in 0.001M NaCl and whose sedimentation value is 10% or above when measured in 1M NaCl.

In this invention, a sedimentation value is determined by first isolating a polymer sample by precipitating the polymer emulsion or polymer solution into an organic solvent, e.g. acetone, which also removes ultraviolet (UV) absorbing substances, e.g. surfactants, then collecting and drying the polymer. A solution of the polymer is then prepared by stirring the isolated polymer in deionized water until it dissolves or forms a homogeneous composition and adding NaCl solution to give a polymer solution having a polymer concentration of 0.05% and a NaCl concentration of (a) 0.001M and (b) 1M. In the case of copolymers of acrylamide and cationic esters, the pH of the solution should be adjusted into the range pH 3–4 using a mineral acid such as hydrochloric acid in order to avoid chemical reaction between neighbouring acrylamide and cationic ester groups (see Draney et al, "Polymer Preprints", 31(2), 500 (1990) which under pH 7–8 conditions can lead to a sedimentable phase, the presence of which can cause a false reading in the determination of sedimentation values. Part of the polymer solution is then centrifuged for about 60 minutes at about 18,000×G (gravity) and 22° C., and the UV absorbance, at 215 nanometres (nm), of the uncentrifuged part and the supernatant of the centrifuged part are measured. The sedimentation value is equal to $\Delta\Delta A/\Delta A$, which is equal to $[\Delta A(\text{uncentrifuged})-\Delta A(\text{centrifuged})]/\Delta A(\text{uncentrifuged})$, where $\Delta A=A(\text{polymer solution})-A(\text{salt solution})$ and A is the measured UV absorbance at 215 nm. A convenient centrifuge is a Labnet ZK380 centrifuge with a fixed angle rotor spinning at 13,000 rpm and a constant temperature of 22° C. The UV absorbance measurements may be performed using a flow-through UV detector (ABI model 875A), drawing the solutions through the detector using a Harvard syringe pump in a withdraw mode at about 0.5 millilitres per minute. Other types of equipment substantially equivalent to that used herein are well known to those skilled in the art.

As already mentioned, the sedimentation value is a measure of the degree of "structure" which is present in a polymer. The term "structure" is used here to refer to the basic topological linkage pattern of the macromolecular chain. A structured polymer, as used herein, contains at least a statistically significant amount of macromolecular chains which have at least some nonlinear topological features, such as branch points, crosslinking or micronetworks. Also, in the sense used here, structured polymers do not contain any appreciable macroscopic gel phase.

Now, in a salt solution, the volumes occupied by polyelectrolytes, (i.e. ionic polymers) tend to contract as the salinity increases. The structured fraction of the macromolecules (predominantly the micronetworked and the branched phases of higher molecular weight is then no longer able to resist sedimentation in a centrifugal field. In this test, therefore, linear polymers, even of a very high molecular weight, e.g. from $5 \times 10^6$ to $20 \times 10^6$, will show no UV absorbance loss (sedimentation value=0%), over the entire salinity range, whereas structured polymers will sediment out to an extent depending both on the degree of structuring present in the macromolecule and the concentration of salt in the solution, and therefore will exhibit a positive sedimentation value even at some salinity.

In accordance with this invention we have found that the polymer blends which provide the best dewatering performance are those which exhibit no, or only a low (less than 10%) sedimentation value at low salinity, i.e. at 0.001M NaCl, but a substantial sedimentation value, i.e. above 10% in 1M NaCl. Thus, the present invention may be envisioned as the discovery that a superior dewatering performance can be secured by engineering a polymer blend having a selected ratio of linear to branched components whilst avoiding the presence of more highly crosslinked components, i.e. those components which would sediment out even at low salinities.

The preferred embodiments of this invention use a moderately structured polymer as the blending partner with the highest degree of structuring, since high degrees of structuring result in an ineffective fraction in the polymer sample, i.e. that fraction which sediments out in 0.001M NaCl, which only increases the dose without any added benefit.

As the other blending partner it is preferred to use a linear or a slightly structured polymer.

Accordingly, preferred polymer blends of this invention have a sedimentation value of less than 5% when measured in 0.001M NaCl and a sedimentation value of 20% or above when measured in 1M NaCl, and more preferably a sedimentation value of substantially zero when measured in 0.001M NaCl and a sedimentation value of 40% or above when measured in 1M NaCl.

The polymer blends of this invention may be formed and used in a variety of different ways. In particular, they may be formed by physically blending separately prepared water-in-oil emulsions of the more structured and the less structured or linear polymers, and the resulting mixed emulsions containing the polymer blend may be used as such in dewatering applications or the blend may be dried using conventional techniques to recover the polymer blend in solid form. It is important that the emulsions should be mixed thoroughly. In order to ensure good compatibility of the blended emulsions it is advantageous if the emulsions being blended are made from similar formulations, e.g. oils, surfactants etc. However, if required stabilising agents such as additional surfactants, oil soluble polymers to thicken the continuous phase, pH adjusters (acids, bases, buffers), and free radical scavengers, may be added at the time of blending the emulsions in order to enhance the stability of blend against phase separation and chemical degradation.

In a modification of this process the blending of the polymer emulsions is performed before the polymerisation reaction forming the more structured and linear or less structured polymers, respectively, have been completed. More particularly, the blending of the polymer emulsions is effected at a stage when the polymerization reactions are capable of proceeding to completion in the resulting blend substantially independently of each other, i.e. when inter-droplet transfer of crosslinking agent is no longer possible. Following the blending step the polymerisation reactions are permitted to go to completion, whereby the final polymer blend is formed in situ.

It is also possible to form a polymer blend of this invention by subjecting at least one of the polymer-containing emulsions to breaking conditions and thereafter effecting the blending so as to form a polymer blend in aqueous solution. An aqueous solution of the polymer blend may also be formed by dissolving, dispersing or suspending a solid polymer blend, recovered from the mixed emulsions by drying, in water or by blending the solutions of pre-dissolved dry polymers. Similarly, this procedure may be used to form a solution or suspension of the polymer blend in a non-aqueous liquid which will not be detrimental to the overall dewatering process in which the polymer blend is to be used, for example a polar-organic liquid such as alcohols, glycols, ketones, aldehydes, ethers, esters, etc.

Solid polymer blends may also be formed by blending pre-dried emulsions of the more highly structured polymer and less structured or linear polymer, respectively.

Whichever method is employed to form the polymer blend in emulsion, solution, dispersion or solid form it is critical that the amounts of the blending components should be such as to form a blend having the sedimentation values in dilute and concentrated salt solutions respectively, described above. Within that general operating parameter, however, it is possible by means of the invention to tailor a polymer blend so as to achieve a given level of dewatering performance for each application, bearing in mind that the highest drainage rate is not always required and that in some cases the optimum dewatering performance may be a compromise between, say, the drainage rate achieved and the dosage required to achieve that drainage rate. Such a compromise is simple to achieve in this invention, since all that is required is to generate performance data using more structured polymer and less structured or linear polymer and then on the basis of this data, and possibly also data from trial polymer blends in different blend ratios, to tailor a blend in the appropriate blend ratio to achieve the desired dose-dewatering performance balance.

For example, we have developed the following laboratory procedure for obtaining drainage laboratory rate-dose curves for the treatment of a sludge, such as for example, waste-activated sludge by polymer blends in emulsion form, and which can then be used to determine the optimum blend ratio for the sludge which is to be dewatered.

Sludge is obtained from the waste treatment plant and allowed to thicken by gravity settling overnight. The supernatant is then decanted off, and the sample is stored under refrigeration until ready for testing. Before testing the sample is allowed to warm to room temperature. A sludge sample more than four days old is discarded. The polymer emulsion to be tested is broken into tap water at a polymer concentration of 0.2 wt % using a hand-held Braun mixer for about 15 seconds. The polymer stock solution is then allowed to age for about 30 minutes before use.

Samples (200 g) of the sludge are weighed out into square containers. Next, aliquots of different volumes of the polymer stock solution are injected into each of the square containers containing the sludge samples and the contents are then mixed for 5 seconds using a speed controlled overhead mixer at 1000 rpm fitted with a flat blade stirrer whose blades nearly span the container width. A sufficient number, usually 4–6, of polymer doses are chosen in order to capture the full characteristics of the performance-dose curves. Once the sludge is conditioned with the polymer in this manner, the conditioned sludge is then immediately poured into a funnel fitted with a wire screen. The filtrate drains through the screen into a beaker positioned on a balance which transfers data to a computer-based spreadsheet. The data recorded are the volumes of filtrate collected after, say, 10 seconds.

In carrying out the test of determining the optimum blending ratio, the polymer blends are tested against a "high end" and a "low end" control, since the characteristics of waste activated sludge vary from day-to-day, even from the same plant. The low end control is typically a slightly structured AMD-Q9 copolymer, while the high end control is typically a moderately structured AMD-Q9 copolymer. The low and/or high end controls may, but need not be, the polymers which it is intended should be blended together.

Of course, as experience is gained with using polymer blends of this invention it will often become possible for the skilled operator to determine the appropriate blend ratio with sufficient accuracy without having to generate performance-dose curves on a daily basis.

Although it is normally possible to obtain a desired level of dewatering performance by blending two polymers, i.e. a more structured polymer with a linear or less structured polymer, it is within the scope of the present invention to blend more than two polymers, for example three, four or even more polymers, each with different degrees of structure, in order to obtain a flocculant with precisely desired characteristics.

As previously described, the blend ratio between the polymer components is determined by the properties of the blend rather than by any predetermined weight ratio. Nonetheless, as a practical matter we normally find that the range of weight ratios for the blends of a structured polymer with a linear or less structured polymer is from 90:10 to 10:90, and that in many cases the more structured polymer forms more than 50% by weight of the blend.

The flocculation and dewatering method of this invention, to release water from a dispersion of suspended solids, is generally carried out by adding the polymer blend either in solution or directly as an emulsion, to the suspended solids, mixing the suspended solids and polymer to flocculate the solids, and then dewatering, preferably using a conventional dewatering apparatus, e.g. centrifuge, belt press, piston press, filter, etc. to remove water from the suspension.

However, it is also possible to effect the dewatering by adding the more highly structured polymer and the linear or less highly structured polymer separately to the dispersion of suspended solids to be dewatered so as to form the desired polymer blend in the suspended solids themselves. In this embodiment, the polymers are preferably substantially added simultaneously to permit the polymer blend to form in situ before the polymers absorb to the suspended solids to a significant extent.

The polymer blends of this invention are useful in facilitating a wide range of solids/liquids separations, including industrial sludges, dewatering suspended solid in wastewater treating applications, for the drainage of cellulosic suspensions such as those found in paper production, and for the settlement of various inorganic suspensions, e.g. in ceramic processing.

However, the blends of this invention are particularly suitable for dewatering sludge, particulary sludge comprising biologically treated suspensions. Generally, sludge is any thick, viscous mass, usually a sediment or filtered waste product. Waste activated sludge refers to sludge which has undergone aerobic, suspended growth and biological treatment using the metabolic reactions of microorganisms to produce a high quality effluent by converting and removing substances having a high oxygen demand. This process for producing waste activated sludge reduces the concentration of dissolved, particulate and colloidal organic pollutants in the wastewater. Additionally, this process also reduces the ammonia concentration in the wastewater (nitrification). Ammonia is an inorganic pollutant toxic to aquatic life at high concentrations and exerts an oxygen demand on the receiving water.

Extended aeration is a waste activated sludge process that retains the waste water in the aeration tank for 18 hours or more and operates in a medium which deprives the microorganisms of enough food to support all of them. The microorganisms therefore compete actively for the limited food supply and even use their own cell mass for food. This highly competitive situation results in a highly treated effluent with low sludge production. See Operation of Municipal Wastewater Treatment Plants, Manual of Practice MOP 11, Vol. 11, 1990, pp. 418–419 and 501–516, which is hereby incorporated herein by reference. As used herein, extended aeration sludge refers to waste activated sludge that has been subjected to the conditions for extended aeration. Alternatively, for the purposes of this invention, extended aeration sludge refers to sludge that has similar chemical and/or physical characteristics typically associated with extended aeration activated sludge.

An important aspect of the instant invention therefore relates to a method of dewatering sludge, more preferably waste activated sludge and most preferably extended aeration sludge.

The optimum dose of the polymer blends may be determined by routine experimentation, well known to those skilled in the art. As already indicated it is found that the polymer blends of the present invention provide, for a given dosage level, a dewatering capability which is greater than that achievable, at that dose, for the components of the blend individually. This is an important technical advantage of the present invention.

Moreover, the polymer blends of this invention are capable of operating over wide dose ranges, typical of structured polymers. This property can make for a more robust water treatment process.

There are also important manufacturing advantages in the production of polymeric flocculants by blending individual polymers as taught in this invention. For example, small deviations in the concentration of crosslinking agent, or changes in the starting reagents (e.g. oil, surfactants, monomers), or processing conditions (e.g. mixing, temperature profiles, initiation rates), can affect the degree of structure, which is obtained in the polymerization process, quite dramatically. Accordingly, it can be difficult to produce a structured polymer of consistent quality. This problem is avoided in the present invention, since it is the structure characteristics of the final polymer blends as determined by their sedimentation values, and not the degree of structure of the individual polymer components per se, which are important. Thus, any deviations from the intended level of structure which result from the polymerization process can be compensated for in the blending process.

The following Examples illustrate the present invention. They are not to be construed to limit the claims in any manner whatsoever.

In each of Examples 1–6 the cationic copolymers which were prepared were of high molecular weight, i.e. they had a molecular weight above $5 \times 10^6$, as determined from the viscosity of a 0.1% solution of unstructured parent polymer in a 1M NaCl solution (the correlation of this solution viscosity and molecular weight having been previously established from intensity light scattering measurements).

EXAMPLE 1

Preparation of a Structured AMD-AETAC Copolymer Emulsion

This example describes the preparation of a structured cationic copolymer of acrylamide (AMD) (60 mol %) and dimethylaminoethyl acrylate, methyl chloride quaternary salt (AETAC) (40 mol %) as an inverse emulsion utilizing N,N'-methylenebisacrylamide as crosslinking agent and isopropanol as chain transfer agent.

An aqueous phase was prepared by mixing together the following ingredients:

| | | |
|---|---|---|
| Acrylamide (50% aqueous solution) | 210.00 | grams |
| Dimethylaminoethyl acrylate, methyl chloride quat (80% solution) | 238.74 | |
| Deionized water | 120.00 | |
| Citric acid (anhydrous) | 17.76 | |
| Diethylenetriamine pentaacetic acid, pentasodium salt (40%) | 0.74 | |
| Isopropanol | 2.16* | |
| N,N'-Methylenebisacrylamide | 0.0030** | |
| Sodium bromate | 0.015 | |

*equivalent to 0.73 wt % based on monomer
**equivalent to 10 ppm based on monomer The pH was adjusted to 3.5 using 2.30 grams of 29% aqueous ammonia, then deionized water was added to bring the total weight to 612.00 grams.

An oil phase was prepared by adding 11.13 grams of sorbitan monooleate and, as second surfactant, 10.29 grams of an ethoxylated linear alcohol mixture (Alfonic 1412-7-Vista Chemical) to 148.58 grams of paraffinic solvent (Escaid 110, Exxon). The aqueous phase was added to the oil phase with mixing; the crude emulsion was homogenized at 4800 rpm for 20 seconds using a Ross 100L Mixer-Emulsifier equipped with a slotted head. The monomer emulsion was transferred to a one-liter jacketed reaction flask with baffles and a Teflon paddle stirrer, gas dip tube, vent line and thermometer; the beaker used to form the emulsion was rinsed with 10 grams of oil, and this was also added to the resin flask. The reaction mixture was sparged with nitrogen for 30–40 minutes.

The polymerization was initiated at 24° C. using sulphur dioxide gas (4000 ppm in nitrogen) at a flow rate of 6–10 cc/min and allowed to exotherm to 40° C. over a 35 minute period. The sulphur dioxide flow rate was gradually increased to 16 cc/min over a 20 minute period while maintaining the reactor temperature between 40–42° C. by circulating water through the reactor jacket. A temperature between 40–42° C. was then maintained throughout the remainder of the reaction which was carried out over an additional 3.5 hours.

After the polymerization was complete, the nitrogen and sulphur dioxide were turned off. 8.0 grams of Alfonic 1412-7 (breaker surfactant) were added over a 15 minute period; the emulsion was allowed to mix for 40–90 minutes, and cool to room temperature.

The properties of the resulting copolymer are given in Table I below.

EXAMPLES 2–6

Following the general procedure described in Example 1 further copolymers of AMD and AETAC were prepared, with different relative amounts of the comonomers and different amounts of the MBA crosslinking agent, or without any crosslinking agent. The composition and properties of the resulting linear (Examples 5 and 6) or structured (Examples 2–4) cationic copolymers are presented in Table I below.

TABLE I

| Example No. | Mol % of AETAC in Copolymer | Chain Transfer Agent (wt %) | Cross-linking Agent | SV (cps) | SED % 0.001 M NaCl | SED % 1.0 M NaCl |
|---|---|---|---|---|---|---|
| 1 | 40 | IPA 0.73% | MBA 10 ppm | 3.0 | 2 | 18 |
| 2 | 35 | LA 0.3% | MBA 20 ppm | 1.9 | 0 | 40 |
| 3 | 55 | IPA 0.52% | MBA 8 ppm | 3.0 | 0 | 24 |
| 4 | 55 | LA 0.2% | MBA 30 ppm | 1.7 | 7 | 63 |
| 5 | 40 | IPA 0.64% | None | 3.5 | 0 | 0 |
| 6 | 55 | IPA 0.5% | None | 3.2 | 0 | 1 |

The abbreviations used in Table I are as follows:
AETAC = dimethylaminoethyl acrylate, methyl chloride quat
IPA = isopropanol
LA = lactic acid
MBA = N,N'-methylenebisacrylamide
SV = standard viscosity
SED = sedimentation value The standard viscosity (SV) values were measured as a 0.1 wt % polymer solution in 1M NaCl at 25° C. using a Brookfield viscometer with a UL adapter and spindle #00 at 60 rpm.

The sedimentation values were measured, in both 0.001M NaCl and 1.0M NaCl, by the method described hereinabove.

EXAMPLES 7–12

Preparation of Blends of Linear or Less Structured Polymers and More Highly Structured Polymers Using the polymer emulsions of Examples 1–6, six polymer blends were prepared by mechanically mixing the emulsions.

Mixing was accomplished by weighing out the appropriate amount of the polymer emulsions to be blended into a glass jar, making sure that about ¼–⅓ of the jar remained empty to allow for proper mixing. The capped jar was then rolled for about an hour to ensure thorough mixing, which was verified visually.

The composition and SED values of the resulting blends are shown in Table II below.

TABLE II

| Ex. No. | Blend Type Component 1/ Component 2 | Polymer Component 1 | Polymer Component 2 | SED 0001 M NaCl | SED 1.0 M NaCl |
|---|---|---|---|---|---|
| 7 | structured/ structured | Ex. 4 50 wt % | Ex. 3 50 wt % | 4 | 44 |
| 8 | structured/ structured | Ex. 4 70 wt % | Ex. 3 30 wt % | 5 | 51 |
| 9 | structured/ linear | Ex. 4 90 wt % | Ex. 6 10 wt % | 6 | 57 |
| 10 | structured/ structured | Ex. 2 50 wt % | Ex. 3 50 wt % | 0 | 32 |
| 11 | structured/ structured | Ex. 2 90 wt % | Ex. 3 10 wt % | 0 | 38 |
| 12 | structured/ linear | Ex. 2 50 wt % | Ex. 5 50 wt % | 0 | 22 |

SED = sedimentation value

Evaluation of Dewatering Characteristics of Polymers and Polymer Blends

Dose-performance characteristics for the polymers of Examples 1–6 and the polymer blends of Examples 7–12 were evaluated on waste activated sludge. The testing protocol was as follows:

Test Protocol 200 g of waste activated sludge (~1.5–2 wt % solids) are weighed out into square containers. If necessary, the sludge is thickened by gravity settling overnight and then decanting off the supernatant. The solids content is checked gravimetrically using a CEM microwave oven. The sludge is stored with refrigeration, and is allowed to warm to room temperature before testing. Waste activated sludge samples more than about 4 days old are discarded.

The polymer emulsion is broken into tap water at a polymer concentration of 0.2 wt % using a hand-held Braun mixer for about 15 seconds. The polymer stock solution is then allowed to age for about 30 minutes before use. Aliquots of different volumes of this polymer stock solution are injected into each of the square containers containing the sludge, and the contents are then mixed for 5 seconds using a speed controlled overhead mixer at 1000 rpm. The mixer is fitted with a flat blade stirrer which nearly spans the container width. A sufficient number of polymer doses are chosen in order to capture the full characteristics of the performance-dose curves; typically 4–6 points.

Once the sludge is conditioned with the polymer in this manner, the conditioned sludge is then immediately poured onto a funnel fitted with a wire screen. The filtrate drains through the screen into a beaker positioned on a balance which transfers data to a computer-based spreadsheet. The volume of filtrate collected after 10 seconds is recorded.

On each day of testing, a high and low end control are included with the data set in order to normalize for day-to-day variations in the sludge.

The dose-performance curves which were obtained are shown in FIGS. 1–5 of the accompanying drawings:

Dose performance curves, measured as dewatering rates at various dosages for waste activated sludge, were generated for most of the Examples herein. The data for each Example tested is set forth below.

dose: #/DT real=pounds of real polymer/dry ton of sludge
DR: drainage rate (milliliters filtrate collected in 10 sec)

EXAMPLE 1

| #DT Real | DR mL/10 s |
|---|---|
| 7.8 | 66 |
| 9.8 | 84 |
| 11.8 | 80 |
| 12.7 | 77 |
| 14.7 | 71 |

EXAMPLE 2

| #DT Real | DR mL/10 s |
|---|---|
| 11.1 | 59 |
| 13.8 | 113 |
| 14.7 | 118 |
| 15.7 | 140 |
| 22.1 | 123 |

EXAMPLE 3

| #DT Real | DR mL/10 s |
|---|---|
| 4.7 | 52 |
| 7.1 | 79 |
| 9.5 | 93 |
| 11.8 | 93 |
| 16.6 | 77 |

EXAMPLE 4

| #DT Real | DR mL/10 s |
|---|---|
| 9.5 | 87 |
| 13.0 | 129 |
| 14.2 | 150 |
| 16.6 | 150 |
| 23.7 | 140 |

EXAMPLE 6

| #DT Real | DR mL/10 s |
|---|---|
| 4.7 | 64 |
| 5.9 | 74 |
| 7.1 | 80 |
| 8.3 | 74 |
| 11.8 | 67 |

EXAMPLE 7

| #DT Real | DR mL/10 s |
|---|---|
| 7.1 | 84 |
| 9.5 | 121 |
| 11.8 | 126 |
| 13.0 | 119 |
| 16.6 | 117 |

EXAMPLE 8

| #DT Real | DR mL/10 s |
|---|---|
| 7.8 | 78 |
| 10.0 | 115 |
| 12.2 | 118 |
| 14.4 | 122 |
| 16.7 | 121 |

EXAMPLE 9

| #DT Real | DR mL/10 s |
|---|---|
| 9.5 | 99 |
| 11.8 | 146 |
| 14.2 | 150 |
| 16.6 | 154 |
| 23.7 | 158 |
| 28.4 | 159 |

EXAMPLE 10

| #DT Real | DR mL/10 s |
|---|---|
| 8.3 | 76 |
| 10.1 | 111 |
| 11.1 | 108 |
| 12.9 | 103 |
| 13.8 | 91 |
| 14.7 | 91 |

EXAMPLE 11

| #DT Real | DR mL/10 s |
|---|---|
| 11.1 | 81 |
| 12.9 | 119 |
| 13.8 | 129 |
| 18.4 | 118 |
| 22.1 | 113 |

EXAMPLE 12

| #DT Real | DR mL/10 s |
|---|---|
| 8.8 | 90 |
| 9.8 | 99 |
| 12.7 | 102 |
| 15.7 | 103 |
| 19.6 | 89 |

FIG. 1

This drawing shows dose performance curves for two polymers and one blend, viz:

(i) the slightly structured polymer of Example 3;
(ii) the more highly structured polymer of Example 4; and
(iii) the 50/50 blend of the polymers of Examples 3 and 4 prepared in Example 7.

All these polymers have the same cationic charge, i.e. they all contain 55 mol % AETAC.

As would be expected, the slightly structured polymer of Example 3 gives a slower dewatering rate than the more highly structured polymer of Example 4.

Surprisingly, however, the blend of the two structured polymers has an optimum flocculation dose, i.e. the smallest dose at which substantially the highest drainage rate is achieved, which is significantly lower than that of the more highly structured polymer of Example 4. Thus, the blend achieves a drainage rate of about 120 ml/10 seconds at a dosage of just over 9 lbs polymer (real) per dry ton of sludge (the basis on which all the dosages are reported herein), whereas to reach this drainage rate with the more structured polymer of Example 4 requires a dosage of just over 12 lbs/ton. This is a significant reduction in flocculant usage for the polymer blend versus the single polymer used by itself.

FIG. 1 (and indeed FIGS. 2–5 as well) show how a polymer blend of this invention can be "tailored" so as to meet defined performance characteristics. In this connection, while high drainage rates are generally preferred, in many instances in industry it is only necessary that a certain threshold of drainage is exceeded. Consequently, the most valuable commercial product will often be that which achieves that threshold level at the lowest dosage. FIG. 1 shows that by conducting dose-performance tests, on a given suspension of solids to be dewatered, for a linear or less structured polymer, as the "low end" control, and similar tests with a more highly structured polymer as the "high end" control, it is a relatively simple matter to find an appropriate blend of polymers of such different degrees of structure which is able to achieve the required performance level at a dosage rate which is lower than that needed, for an equivalent performance, with the more highly structured polymer. Indeed, with experience, persons skilled in the art will often be able to formulate a blend meeting defined performance criteria sufficiently closely for commercial purposes simply by using their knowledge of the dose-performance characteristics of the single polymers on the type of suspended solids concerned and without having to conduct dose-performance tests on the blends themselves.

FIG. 2

This drawing shows dose performance curves for:

(i) the linear polymer of Example 6,
(ii) the moderately structured polymer of Example 4, and
(iii) the 90/10 wt % blend of these two polymers prepared in Example 9.

As was the case in FIG. 1, the polymers forming the blend have the same cationic charge (55 mol % AETAC).

Again, the superiority of the blend, in achieving a high drainage rate at a relatively lower dosage, is clearly demonstrated.

Thus, the blend achieves a similar, or slightly higher, maximum drainage rate to the moderately structured polymer of Example 4, but with the blend this level is reached at a dosage of about 2 lbs/ton less than with the single polymer.

FIG. 3

This drawing shows dose performance curves for two polymers and two blends, viz:

(i) the slightly structured cationic polymer of Example 3,
(ii) the more highly structured cationic polymer of Example 2,
(iii) the 50:50 blend of the polymers of Examples 2 and 3 prepared in Example 10, and
(iv) the further blend of the polymers of Examples 2 and 3, containing 90 wt % of the more highly structured polymer of Example 2, which was prepared in Example 11.

In this case, the two polymers forming the blends have different levels of cationic charge, viz 35 mol % AETAC for the polymer of Example 2 and 55 mol % AETAC for the polymer of Example 3.

Comparing the dose-performance curves for the two blends, versus those for the single polymer components of the blends, it will be noted that both blends have an optimum flocculation dose which achieves a given level of dewatering performance at a lower dosage rate than is needed to achieve that same level of dewatering performance with the more highly structured polymer of Example 2. The 50/50 blend of Example 10 has an optimum drainage rate lower than that for the 90/10 blend of Example 11, and for many commercial applications the former would be the flocculant of choice since it reaches a relatively high drainage rate of about 110 ml/10 s at a dose of only 10 lbs/dry ton, significantly lower than the dosage needed for the 50/50 blend or the polymer of Example 2.

FIG. 4

This graph shows the dose performance curves for the following:

(i) the slightly structured polymer of Example 1,
(ii) the moderately structured polymer of Example 2, and
(iii) the 50/50 blend of linear/moderately structured polymer prepared in Example 12.

In this experiment, all the polymers used had approximately the same cationic charge, i.e. in the range 35–40 mol %.

Again, the advantages of the blend of the invention are apparent. In particular, it is seen that the good performance of the blend persists to higher doses than it does for the slightly structured polymer, whereby overdosing will be less of a potential problem.

FIG. 5

In this graph there are shown the dose-performance curves for:

(i) the slightly structured polymer of Example 3,
(ii) the moderately structured polymer of Example 4, and
(iii) the 70/30 blend of the Example 4/Example 2 polymers prepared in Example 8.

In this experiment, both the polymers forming the blend had the same cationic charge (55 mol % AETAC).

Comparing the dose-performance curve of the 70/30 blend with that of the 50/50 blend of the same polymers shown in FIG. 1, it will be seen that the 70/30 blend, like the 50/50 blend, gives a high drainage rate at a significantly lower dosage rate than is needed to obtain the same performance from the moderately structured cationic polymer of Example 4. This also, with FIG. 1 demonstrates the broad range of blend ratios which can provide useful dewatering performance.

What is claimed is:

1. A water-in-oil polymer emulsion in which the aqueous phase comprises a blend of:
    (i) a water-soluble, cationic, structured first polymer having a molecular weight of at least $1 \times 10^6$, and
    (ii) a water-soluble, cationic second polymer having a molecular weight of at least $1 \times 10^6$, said second polymer being linear or having a lower degree of structure than said first polymer,
and said polymer blend having a sedimentation value of less than 10% when measured in 0.001M NaCl and a sedimentation value of 10% or above when measured in 1M NaCl.

2. A polymer emulsion of claim 1, wherein said polymer blend has a sedimentation value of less than 5% when measured in 0.001M NaCl and a sedimentation value of 20% or above when measured in 1M NaCl.

3. A polymer emulsion of claim 2, wherein said polymer blend has a sedimentation value of 40% or above when measured in 1M NaCl.

4. A polymer emulsion of claim 2, wherein said polymer blend has a sedimentation value of substantially zero when measured in 0.001M NaCl.

5. A polymer emulsion of claim 2, wherein said second polymer is linear and has a molecular weight in the range of about $5 \times 10^6$ to $20 \times 10^6$ as measured by intensity light scattering.

6. A polymer emulsion of claim 1, wherein said first polymer and said second polymer have the same chemical composition.

7. A polymer emulsion of claim 1, wherein at least one of said first polymer and said second polymer contains at least about 20 mole percent cationic units based on the total number of moles of recurring units in said polymer.

8. A polymer emulsion of claim 1, wherein at least one of said first polymer and said second polymer contains recurring (meth)acrylamide units.

9. A polymer emulsion of claim 1, wherein at least one of said first polymer and said second polymer contains at least about 30 mole percent quaternized dialkylamino(alk) acrylate units based on the total number of moles of recurring units in said polymer.

10. A polymer emulsion of claim 6, wherein each of said first polymer and said second polymer is a copolymer of acrylamide and 2-acryloyloxyethyltrimethylammonium chloride.

11. A method of making a water-in-oil polymer emulsion, comprising the steps of:
    (i) providing a first water-in-oil emulsion of a water-soluble, cationic, structured first polymer having a molecular weight of at least $1 \times 10^6$,
    (ii) providing a second water-in-oil emulsion of a water-soluble, cationic second polymer having a molecular weight of at least $1 \times 10^6$, said second polymer being linear or having a lower degree of structure than said first polymer, and
    (iii) physically blending said first and said second water-in-oil emulsions in relative amounts such as to provide a polymer blend having a sedimentation value of less than 10% when measured in 0.001M NaCl and a sedimentation value of 10% or above when measured in 1M NaCl.

12. A method of claim 11, wherein said first and said second water-in-oil emulsions are blended in step (iii) to provide a polymer blend having a sedimentation value of less than 5% when measured in 0.001M NaCl and a sedimentation value of 20% or above when measured in 1M NaCl.

13. A method of claim 11, wherein said first and said second water-in-oil emulsions are blended in step (iii) to provide a polymer blend having a sedimentation value of less than 5% when measured in 0.001M NaCl and a sedimentation value of 40% or above when measured in 1M NaCl.

14. A method of making a water-in-oil polymer emulsion comprising the steps of:

(i) providing a first water-in-oil emulsion containing at least one first water-soluble, cationic monomer and crosslinking agent in amount to form a structured first polymer having a molecular weight above $1 \times 10^6$ on subjecting the emulsion to polymerisation conditions, and either (iia) providing a second water-in-oil emulsion containing at least one second water-soluble, cationic monomer which forms a second linear polymer having a molecular weight above $5 \times 10^6$ and a degree of structure lower than said first polymer on subjecting the emulsion to polymerisation conditions, or (iib) providing a second water-in-oil emulsion containing at least one second water-soluble, ionic monomer and crosslinking agent in amounts to form a second structured polymer having a molecular weight above $5 \times 10^6$ on subjecting the emulsion to polymerisation conditions, (iii) subjecting said first water-in-oil emulsion to polymerisation conditions to form a water-in-oil emulsion containing a structured first polymer having a molecular weight above $5 \times 10^6$, (iv) subjecting said second water-in-oil emulsion to polymerisation conditions to form a water-in-oil emulsion containing a second polymer having a molecular weight above $5 \times 10^6$, said second polymer being linear or having a degree of structure lower than said first polymer, and (v) thereafter blending said first and said second water-in-oil polymer-containing emulsions in relative amounts such as to provide a polymer blend having a sedimentation value of less than 5% when measured in 0.001M NaCl and a sedimentation value of 20% or above when measured in 1M NaCl.

15. A method of making a water-in-oil polymer emulsion, comprising the steps of:

(i) providing a first water-in-oil emulsion containing at least one first water-soluble, cationic monomer and crosslinking agent in amounts to form a structured first polymer having a molecular weight above $1 \times 10^6$ on subjecting the emulsion to polymerisation conditions, and either:

(iia) providing a second water-in-oil emulsion containing at least one second water-soluble, cationic monomer which forms a second, linear polymer having a molecular weight above $1 \times 10^6$ on subjecting the emulsion to polymerisation conditions, or (iib) providing a second water-in-oil emulsion containing at least one second water-soluble, cationic, monomer and crosslinking agent in amounts to form a second structured polymer having a molecular weight above $1 \times 10^6$ on subjecting the emulsion to polymerisation conditions, said second polymer having a lower degree of structure than said first polymer, (iii) subjecting said first and said second water-in-oil emulsions to polymerisation conditions, (iv) prior to the completion of said polymerisation reactions, physically blending said first and said second water-in-oil emulsions containing partially polymerised monomer, said blending being effected at a stage when the polymerisation reactions are capable of proceeding to completion in the resulting blend substantially independently of each other, and (v) permitting the polymerisation reactions to go to completion, and wherein said first and said second water-in-oil emulsions are blended in step (iv) in relative amounts such that the blend of completely polymerised polymers formed in step (v) has a sedimentation value of less than 10% when measured in 0.001M NaCl and a sedimentation value of 10% or above when measured in 1M NaCl.

16. A method of claim 15, wherein said first and said second water-in-oil emulsions are blended in step (iv) to provide in step (v) a polymer blend having a sedimentation value of less than 5% when measured in 0.001M NaCl and a sedimentation value of 20% or above when measured in 1M NaCl.

17. A method of claim 15, wherein said first and said second water-in-oil emulsions are blended in step (iv) to provide in step (v) a polymer blend having a sedimentation value of less than 5% when measured in 0.001M NaCl and a sedimentation value of 40% or above when measured in 1M NaCl.

* * * * *